United States Patent [19]

Glenn

[11] Patent Number: 4,878,122
[45] Date of Patent: Oct. 31, 1989

[54] LIGHT MODULATOR VIDEO DISPLAY APPARATUS

[75] Inventor: William E. Glenn, Ft. Lauderdale, Fla.

[73] Assignee: New York Institute of Technology, Old Westbury, N.Y.

[21] Appl. No.: 94,382

[22] Filed: Sep. 4, 1987

[51] Int. Cl.$^4$ .............................................. H04N 5/74
[52] U.S. Cl. ..................................... 358/233; 358/62; 358/213.13
[58] Field of Search .................. 358/62, 213, 233, 234, 358/231; 350/360

[56] References Cited

U.S. PATENT DOCUMENTS

| | | | |
|---|---|---|---|
| 3,882,271 | 5/1975 | Glenn | 178/7.3 D |
| 4,119,368 | 10/1978 | Yamazaki | 350/360 |
| 4,229,732 | 10/1980 | Hartstein et al. | 340/378.2 |
| 4,387,402 | 6/1983 | Lewis | 358/213 |
| 4,403,248 | 9/1983 | Te Velde | 358/62 |
| 4,441,791 | 4/1984 | Hornbeck | 350/360 |
| 4,514,765 | 4/1985 | Miyata et al. | 358/213 |
| 4,529,620 | 7/1985 | Glenn | 427/88 |
| 4,626,920 | 12/1986 | Glenn | 358/234 |
| 4,639,788 | 1/1987 | Glenn | 358/233 |
| 4,641,193 | 2/1987 | Glenn | 358/233 |

OTHER PUBLICATIONS

L. J. Hornbeck, "128×128 Deformable Mirror Device", IEEE Trans. of Electron Der., May 1983.
E. T. Kozol et al., "Target Assembly for Deformographic Display Device", IBM Tech. Discl. Bulletin, Apr., 1978.

Primary Examiner—Tommy P. Chin
Attorney, Agent, or Firm—Martin M. Novack

[57] ABSTRACT

A solid state light modulator apparatus for displaying images represented by video signals. The system includes an array of semiconductor devices having electrodes which extend over the tops of their respective devices. The devices are used, in conjunction with related circuitry, for applying sampled video signals to the electrodes. The resulting charge pattern deforms a concuctive/reflective layer, and the deformations are converted to a viewable image by an optical system. The electrodes are divided into separated fingers which decreases the effective grating line spacing of the light modulator and accordingly increases resolution. Also, the electrodes are at two different levels, and the spurious light immunity of the light modulator is improved.

40 Claims, 13 Drawing Sheets

LIGHT MODULATOR VIDEO DISPLAY APPARATUS

BACKGROUND OF THE INVENTION

This invention relates to video display systems and, more particularly, to improvements in the type of video display which employs a deformable reflective surface having deformations that depend upon a stored charge pattern and an optical subsystem for converting the deformations into a viewable image.

There have been previously set forth techniques for displaying video information by storing a charge pattern representative of a video frame in a frame store and utilizing the charge pattern to modify a characteristic of a material. The modified characteristic of the material is then used to obtain a viewable image. For example, in my U.S. Pat. No. 3,882,271 there is disclosed a system called a solid state light modulator wherein a charge pattern on a special array of semiconductor devices is used to obtain deformations of a conductive reflective layer disposed over the array and spaced therefrom by an elastomer material such as silicone gel. An optical subsystem, such as a Schlieren optical system, can then be utilized to convert the pattern of deformations (or "ripples") in the reflective layer into a viewable image. The solid state light modulator is described further in my U.S. Pat. Nos. 4,529,620, 4,626,920, 4,639,788, and 4,641,193.

In my U.S. Pat. Nos. 4,639,788 and 4,641,193 there is disclosed a solid state light modulator which includes an array of columns and rows of devices in a semiconductor substrate. The devices comprise field-effect transistors having spaced doped regions and a gate electrode disposed over an insulating layer that covers the area between the doped regions. A conductive so-called deflection electrode is coupled to one of the doped regions and has a top flat region which extends over its associated device and is spaced therefrom by an insulating material. The deflection electrodes are spaced from the conductive reflective layer by the elastomer, as mentioned above. The desired deformations of the conductive reflective layer are caused by the signals applied to the deflection electrodes. These signals are applied to the appropriate field effect devices, and the devices are switched on at the appropriate times by an addressing system.

In the described system, as set forth in my above-referenced patents, the electrostatic force between each deflection electrode and the overlying portion of the conductive/reflective layer depends upon the voltage difference between the particular deflection electrode and the conductive/reflective layer. This force results in deformation of the conductive/reflective layer which, in turn, is ultimately converted by the optical system into an element of an image. Accordingly, it will be understood that the number of deflection electrodes in the array will determine the grating line spacing of the light modulator and, accordingly, the resolution capability of the system.

One method for increasing the number of deflection electrodes would be to increase the number of elements in the array, but it will be understood that this would increase the cost and difficulty of fabrication. In addition to the obviously greater cost of providing more transistors and associated addressing circuitry, if the packing density of devices is increased, there will be a concomitant increase in the difficulty of designing and fabricating the array.

It is among the objects of the present invention to provide a device, of the general type described, which has improved resolution capability, but does not require a greatly increased number of switching devices in its array or unduly complicate the addressing system.

When making a solid state light modulator of the type described, one of the concerns is the intrusion of light from the imaging system onto the semiconductor devices of the array. The light to be reflected off the conductive/reflective layer of the solid state light modulator is very bright. The conductive/reflective layer cannot be too thick, since it must be deformable. Some of the intense light incident on the conductive/reflective layer is not reflected, and it passes through the conductive/reflective layer and the elastomer layer. Light that strikes certain regions of the semiconductor device can cause spurious switching and/or generation of signals that can degrade or ruin the image to be produced. In my above referenced U.S. Pat. Nos. 4,639,788 and 4,641,193, the deflection electrodes substantially cover their respective semiconductor devices, and provide a degree of protection against the incursion of light. Also, a pattern of isolation electrodes are shown as being disposed between the deflection electrodes.

It is among the additional objects of the present invention to further improve the immunity of the solid state light modulator semiconductor devices against incursion of light from its optical system.

SUMMARY OF THE INVENTION

The present invention is directed to an improved video display apparatus for generating images represented by input video signals. The apparatus includes an array of semiconductor devices having respective electrodes to which charge is applied in accordance with the input video signals. A layer of deformable material is disposed over the electrodes, and a conductive/reflective (i.e., conductive and reflective) layer is disposed over the deformable layer. Optical means, such a Schlieren optical system, are provided for converting deformations of the conductive/reflective layer into an image.

In accordance with an embodiment of the improvement of the invention, each electrode of the array has a plurality of spaced conductive regions having respective surfaces of relatively large area in a common plane. The plurality of conductive regions of each electrode are electrically connected in common by at least one conductor having, at most, a relatively small area in said plane. Reference conductive regions have further surfaces in said plane, the further surfaces being between, and separated from, the surfaces of the electrodes. At least some of the reference conductive regions are electrically coupled in common. Means are provided for applying input video signals to the electrodes of the array, and for applying at least one reference potential to the reference conductive regions.

As described further hereinbelow, in accordance with a feature of the invention as set forth, the improved electrode and reference conductor configuration results in a finer grating line spacing without increase of the number of devices in the array.

In accordance with a further embodiment of the invention, each conductive electrode has a first surface region at a first level above the semiconductor substrate and a plurality of further spaced apart surface regions at a second level above the first level. In this embodiment, reference conductive regions have surfaces at the second level which are disposed between the further surface regions of the electrodes and are separated therefrom. At least some of the reference conductors are connected in common. An additional advantage of this embodiment is the presence of conductors at two separated levels of the structure (the levels preferably being separated by insulating material such as silicon dioxide), which can serve to provide further protection against light from the optical system passing through the upper portions of the structure and striking the transistor devices.

In a still further embodiment of the invention, each electrode has a surface region at a first level above the semiconductor substrate. A plurality of reference conductive regions are located at a second level above said surface region of the electrode below, the levels again being separated by an insulating material. In this embodiment, however, the conductive regions at the second level are not coupled to the first level surface region of the electrode below. Rather, a reference potential is applied to the reference conductive regions. The reference conductive regions at the second level overlay only part of the electrode surface regions at the first level. As a result, each electrode is effectively divided into a plurality of portions which exert a force on the conductive/reflective layer (depending on the signal applied to the particular electrode) whereas, the reference conductive regions overlaying the regions between the stated portions exert a force on the conductive/reflective layer that depends on the reference potential applied to the reference conductive regions. This again results in an increase of the number of grating lines obtainable from an array of given number of electrodes. In a form of this embodiment, the conductive regions comprise a conductive layer at the second level, the conductive layer having a plurality of openings above each of the electrodes. The conductive layer can be divided into separate patterns above respective lines of the array, so that different reference potentials can be applied to different lines.

Further features and advantages of the invention will become more readily apparent from the following detailed description when taken in conjunction with the accompanying drawings.

DESCRIPTION OF THE PREFERRED EMBODIMENT

Figure 1:
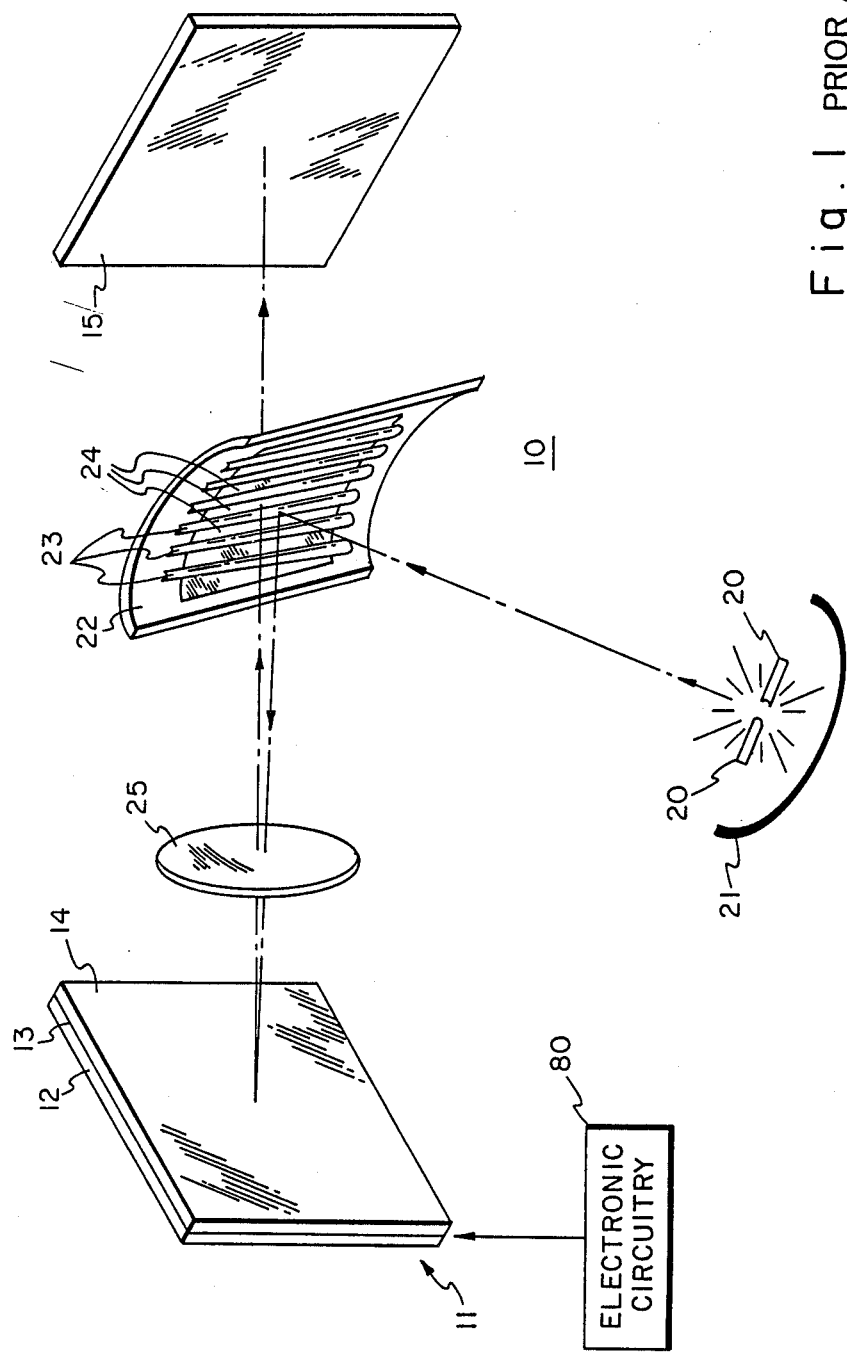
FIG. 1 is a simplified diagram of a type of prior art apparatus for displaying images, in which the improvements of the invention can be made.

Referring to FIG. 1, there is shown a simplified schematic diagram of the type of apparatus 10 in which the improvements of the invention are made. A semiconductor substrate 11 has an array of devices formed in a surface 12 thereof, these devices serving as semiconductor controlled storage units. A layer of deformable material 13 (which may be, for example, an elastomer such as silicone gel) covers the surface 12, and a reflective layer 14 of conductive material is disposed over the deformable layer 13. The semiconductor device array, and associated circuitry 80, to be described further hereinbelow, receives and samples a video signal, the samples ultimately being stored as a charge pattern on the surface 12 of semiconductor 11. The electric field associated with the charge pattern results in a force with respect to the layer 14 which deforms the deformable material 13 and layer 14 so that information is contained in the reflective layer 14 in the form of depressions or ripples which are similar to a phase diffraction grating. This information is then displayed on a screen 15, such as by using a Schlieren type of optical system.

The optical system depicted in FIG. 1 can be generally of the type disclosed in U.S. Pat. Nos. 3,084,590, 3,882,271, and 4,641,193. In this system arc electrodes 20 generate an intense light source that is directed by a curved mirror 21 over a masking system which includes a plurality of reflecting bars 23 separated by transparent areas or slits 24. The masking system 22 is positioned so that the light reflected from the bars 23 is transmitted toward a lens 25 where it is focused into parallel rays. These rays are incident on the deformed reflective surface 14 and are reflected back through the lens 25 toward the masking system. If, at a given instant, there were no depressions on the surface 14 to divert the light rays, the rays effectively emanating from each bar 23 would be focused by lens 25 on a bar and no light would be incident on the screen 15. However, if there are depressions in the surface 14 they will act as diffraction gratings and some light will be diffracted and ultimately pass through the slits 24. The portion of a light rays transmitted through a particular slit depends on the amplitude of the infinitesimal diffraction grating from which the ray was diffracted. Thus, an appropriate pattern of diffraction gratings, resulting from a selected charge pattern, will yield a desired image on the screen 15. The charge pattern is stored by the array of semiconductor devices, to be described, in the semiconductor substrate 11. In embodiments hereof, the array of semiconductor devices is arranged in a diagonal pattern, and the Schlieren bars are also oriented diagonally, as shown in FIG. 1.

Reference to prior art light modulator systems can be made to my abovereferenced U.S. Pat. No. 3,882,271, and also to the U.S. Pat. No. 4,441,791, which is of a different type in that it discloses a deformable mirror mounted on a grid over an array of semiconductor devices to form air-gap capacitors. Deformations of the mirror surface can be converted into an image by an optical system.

Figure 2:
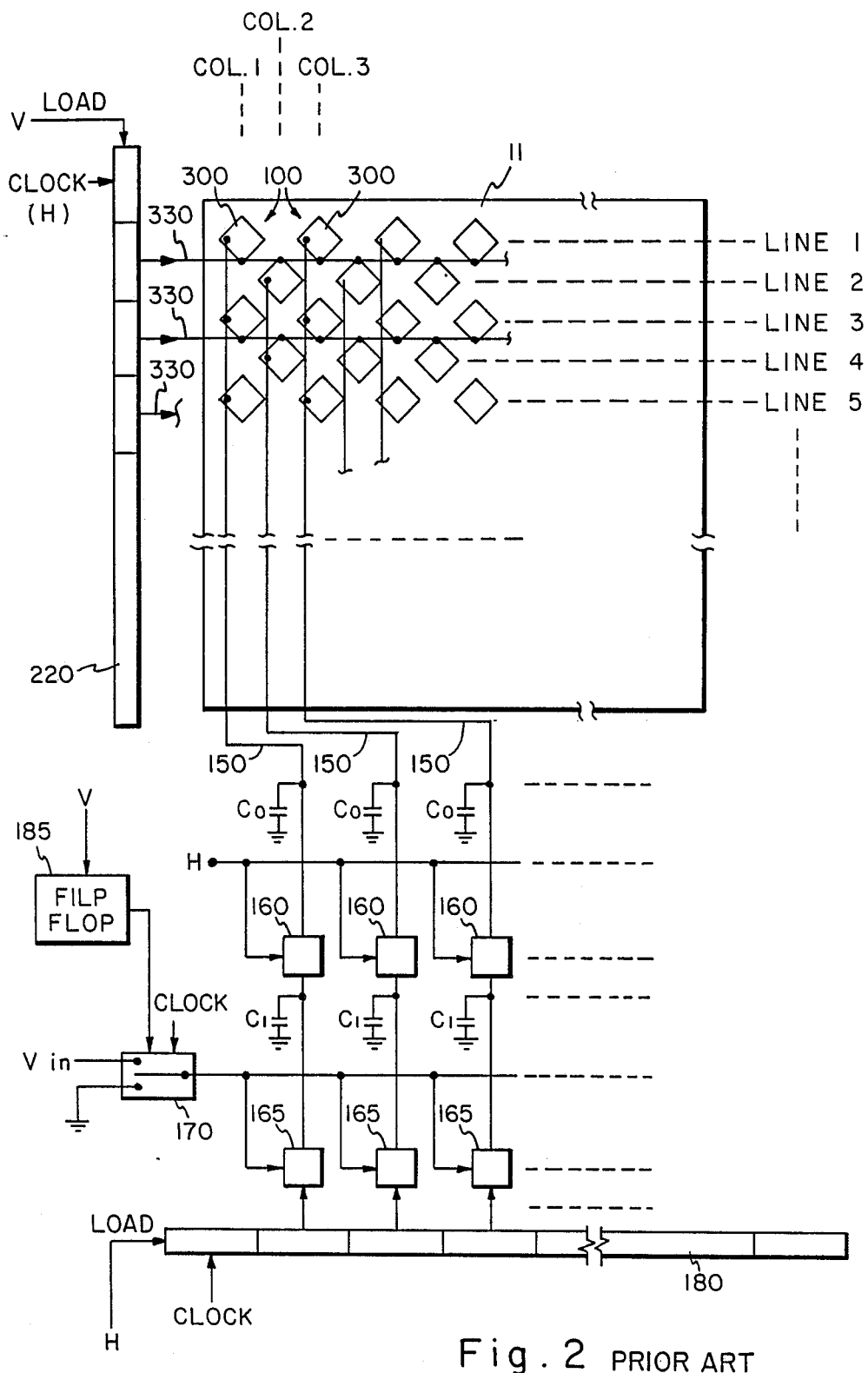
FIG. 2 is a block diagram, partially in schematic form, of a portion of a prior art apparatus.

Referring to FIG. 2, there is shown an array of devices in semiconductor substrate 11. In the diagram of FIG. 2, each device or element 100 is illustrated by its deflection region 300, which is shown as being a square in the prior system, the squares being oriented and arranged in a diagonal pattern; i.e., with the deflection electrodes of each row of the array being offset horizontally with respect to its adjacent rows.

Figure 3:
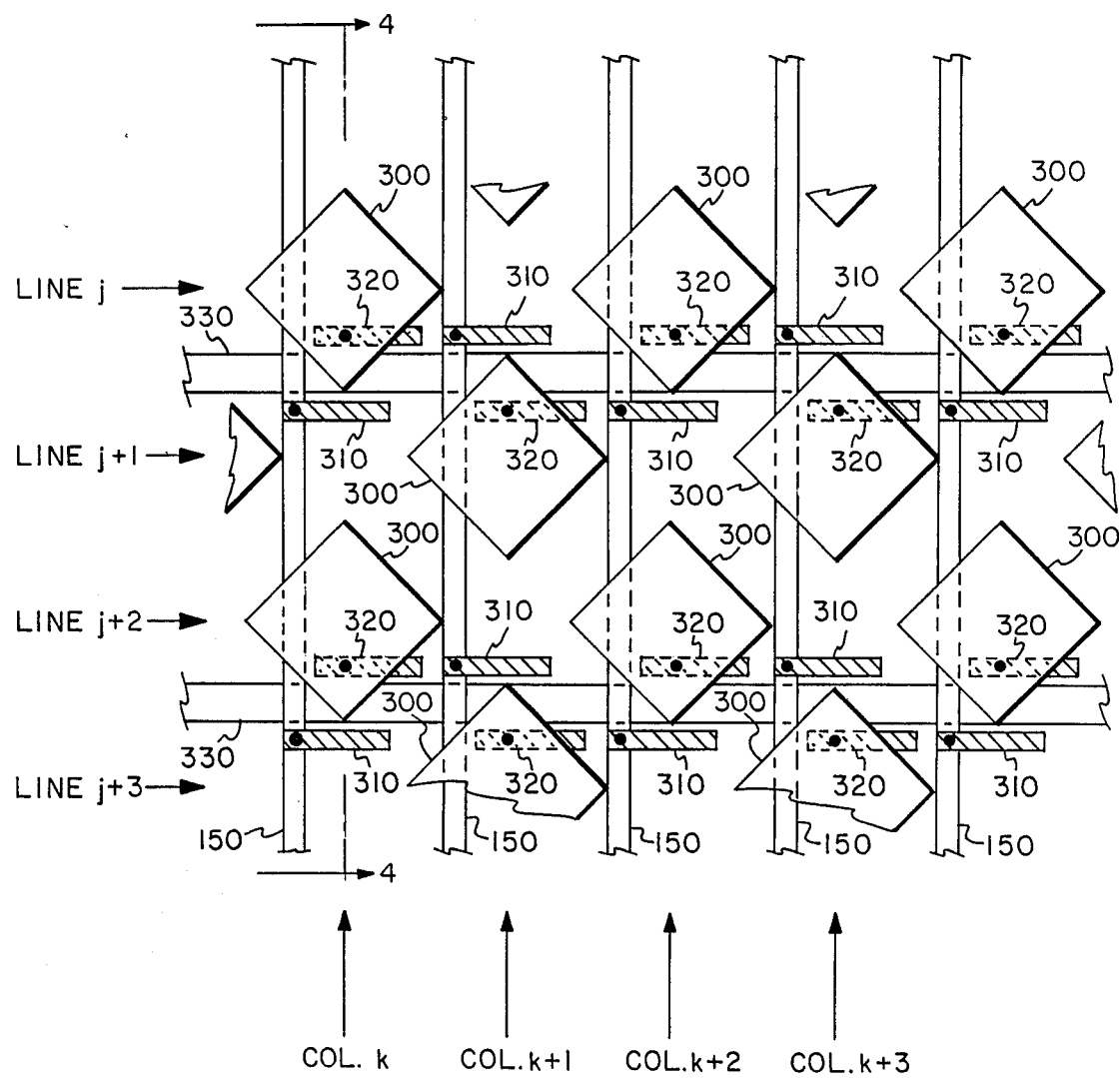
FIG. 3 shows further detail of the semiconductor devices of the prior art apparatus.

In the FIG. 2 system, the lines of elements 100 are numbered at the right of the Figure as line 1, line 2, etc., and illustrative elements from a central exemplary portion of the array are shown in FIG. 3 which shows a small portion of four consecutive lines designated using the generalized terminology of line j, line j+1, line j+2, and line j+3. In FIG. 2, the columns of the array are numbered as column 1, column 2, column 3, etc., and in FIG. 3 the columns from a central exemplary portion of the array, are designated as column k, column k+1, column k+2, and column k+3. Each element of a column of the array is coupled in common, in a manner to be described, to a common column conductor 150 for that line, as seen in FIGS. 2 and 3. As seen in FIG. 2, the respective column conductors are coupled to respective sides of capacitors Co, the other sides of which are coupled to ground reference potential. [These and other groups of capacitors can be considered as storage registers, and it is noted that suitable analog registers (or digital registers in conjunction with conversion circuitry), such as charge coupled device registers, could alternatively be employed.] The column conductors and respective capacitors Co are also coupled, via respective switches 160, to respective sides of capacitors C1, the other sides of which are also coupled to ground reference potential. [Again, these capacitors can be considered as a storage register.] The switches 160 are simultaneously enabled by a signal derived from the horizontal sync signal, H. The capacitors C1 are also each coupled, via respective switches 165, to the output of another switch 170. The switches 165 are respectively enabled by signals on the output lines of respective stages of a shift register 180. The register 180 is loaded at one end (the right end in FIG. 2) with a logical "1" (high) level which is clocked through the register at a basic system element rate, from a clock, not shown. In the referenced U.S. patents, switch 170 is operative, under control of the output of flip flop 185, and the clock signal, to couple either the video input signal or ground reference potential to the inputs of switches 165. The vertical synchronizing signal, V, is utilized to set a different initial state of the flip flop 185 for the beginning of each scanline of a given field. In this manner, the switch 170 is used to load a scanline of information into capacitors C1 (via switches 165), under control of register 180, with successive samples of input video information alternating with ground reference potential.

The row conductors 330 are coupled to respective outputs of shift register 220, the outputs of register 220 being used to selectively enable the row conductors in sequence. The register 220 is clocked by the horizontal synchronizing signal, and is synchronized by the vertical synchronizing signal, V. At the beginning of each field, a signal derived from V is used to load the first stage of the shift register 220 with a logical "1" (high) level. At each horizontal scanline of the field, the logical "1" level is shifted to the next position in the register so that the row conductors are sequentially enabled, one line at a time.

In operation of the system of FIGS. 2 and 3, and as described in the referenced patents, a scanline of sampled video information is read sequentially into the capacitors C1 in alternation with ground reference potential. At the end of the scanline, a signal derived from the horizontal sync signal H is used to enable switches 160, so that the sampled video information (and gnd, as the case may be) in the capacitors C1 is coupled to respective capacitors Co and the respective column conductors 150. This substantially stores the sampled elemental signals in capacitors Co where they are applied, during the next scanline (and while the next line of video information is being read into the respective capacitors C1), to the respective column conductors. The signal derived from H is also operative, at this time, to shift the register 220 so as to enable the next row conductor for the duration of the next line. The capacitors C1 and Co are charged (or discharged, as the case may be) through low impedances, so they can be charged in the relatively short durations during which their respective switches are enabled.

Each elemental signal can now be transferred into the respective deflection electrodes 300, of the two successive lines whose common row conductor has been enabled by the output of the register 220. Every other signal level entered in capacitors Co was at ground reference potential. Therefore, the video signal samples for the given scanline will be transferred into the respective deflection electrodes of one of the lines associated with the enabled row conductor, and ground reference potential will be transferred into each of the deflection electrodes of the other line which shares the energized row conductor.

During the transfer from the input capacitors Co to the respective deflection electrodes of the lines associated with the enabled row conductor, which occurs during approximately one scanline period, the next scanline of video information is being read into the capacitors C1 (again, in alternation with ground reference potential). In this manner, substantially a full scanline duration is available for transfer of the signal from the capacitors Co into the capacitance associated with the respective deflection electrodes. In particular, this capacitance comprises the capacitor formed by each deflection electrode 300 and the common electrode 14 (e.g. FIGS. 1 and 3) disposed above the deformable material (which is shown at ground reference potential in this example, but which can be operated at a negative bias voltage, as described in the referenced patents), and stray capacitance. In copending U.S. patent application Ser. No. 053,572, assigned to the same assignee as the present application, there is disclosed a technique wherein the impedance in each column conductor between the input capacitor and its associated deflection electrodes is caused to vary in accordance with the change in video signal level from frame to frame, so as to achieve video noise reduction.

Figure 4:
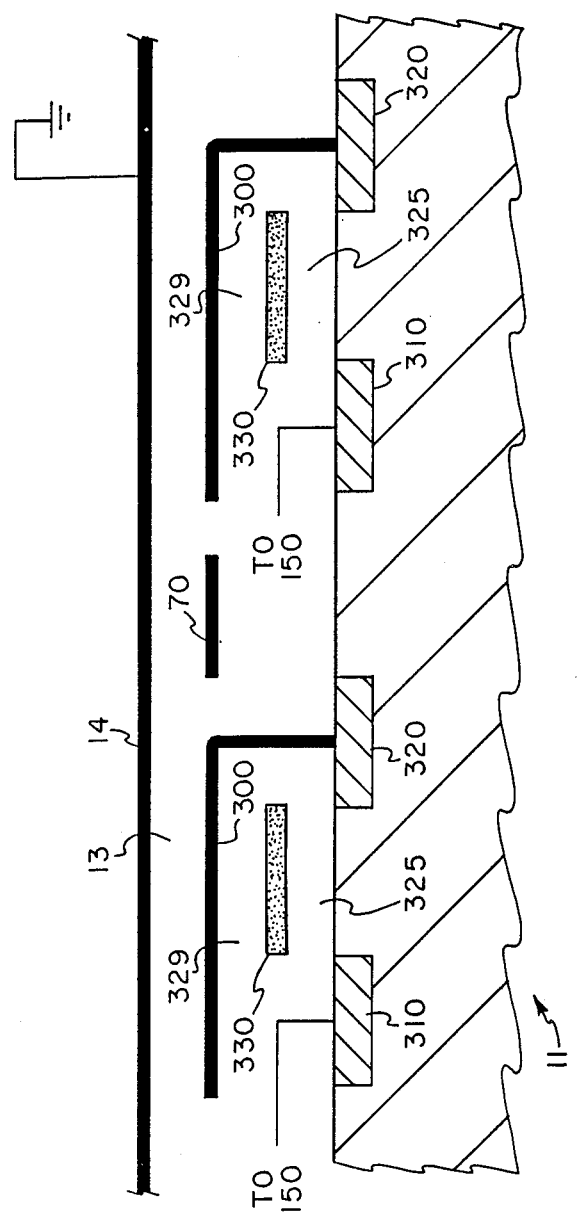
FIG. 4 shows a cross sectional view of the prior art semiconductor devices of FIG. 3 as taken through the section defined by arrows 4—4 in FIG. 3.

FIGS. 3 and 4 illustrate the configuration, as set forth in the referenced patents, of the devices 100 formed in the semiconductor substrate. The substrate is n-type silicon, and the regions 310 and 320 are spaced p-type diffusions, for example boron diffusions. The regions 310 are coupled to associated column conductors 150. The regions 320 are coupled to the respective deflection electrodes 300. An insulating region 325, typically a silicon dioxide layer, covers the semiconductor region between diffusions 310 and 320. The respective row conductors 330 are disposed above oxide layers 325, of the devices of their associated rows and serve as gates which, when energized or enabled, cause p-channel conduction between the regions 310 and 320 so that the signals on the column conductor lines are effectively coupled to the deflection electrodes 300 of the devices on the enabled rows. The deflection electrodes 300 have top flat regions which extend over their associated devices and are spaced therefrom by insulating material such as silicon dioxide 329. The row switching, at the line rate of operation, permits use of polysilicon, while the faster column switching employs metal conductors in the present embodiments.

Figure 5:
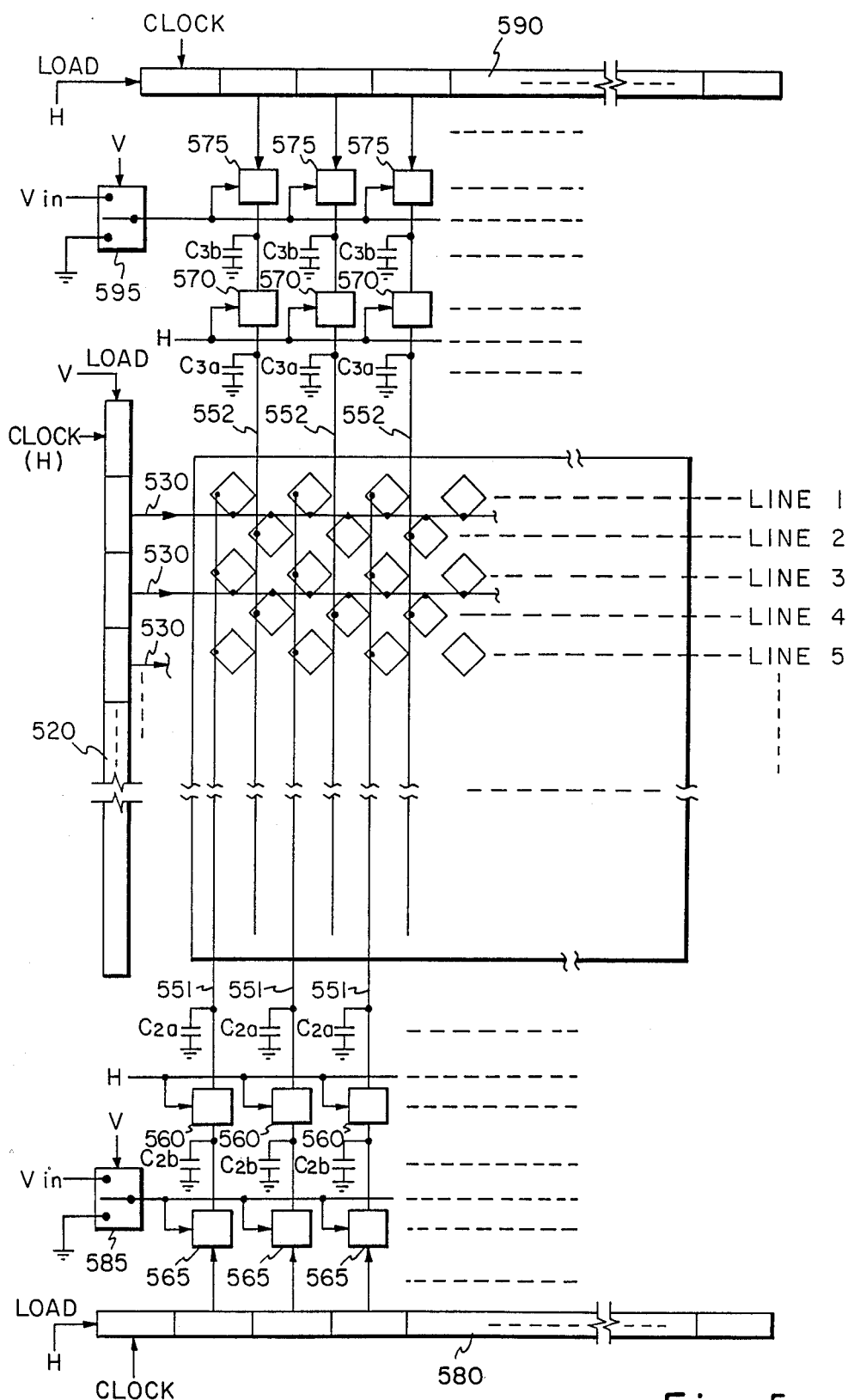
FIG. 5 is a block diagram, partially in schematic form, of a portion of another prior art apparatus.

In the system of FIGS. 2-4, as set forth in the referenced patents, the system clock rate used to clock the sampled video signal into the storage capacitors (and ultimately into the array) is twice the rate at which video information is being entered, since half the time is being used to clock ground reference potential into every other horizontal element of a line. As described in the referenced patents, by using the system illustrated in FIG. 5, a clock rate can be used which is the same as the rate at which information is entered into the array. The device display electrodes of FIG. 5 are shown as being in the same general configuration as in FIG. 2. The row conductors 530 are coupled to the outputs of a shift register 520, and operate like their counterparts in FIG. 2 to sequentially enable row pairs of devices. The column conductors 551 of the odd columns are coupled to circuitry similar to that of FIG. 2; namely, to respective capacitors C2a, respective switches 560 that are again enabled by a signal derived from the horizontal sync signal H, respective capacitors C2b, and respective switches 565 which are enabled by respective outputs of shift register 580, which is clocked at the basic system clock rate and operates to successively enable the switches 565. The input to switches 565 is the output of a switch 585 which passes the input video signal during odd video fields and passes ground reference potential during even video fields.

The even column conductors 552 are coupled to similar circuitry which includes respective capacitors C3a, respective switches 570 that are enabled by a signal derived from the horizontal sync signal H, respective capacitors C3b, and respective switches 575 which, again, are sequentially enabled by respective output stages of a shift register (590) which is clocked at the basic system clock rate and operates to successively enable the switches 575. The input to switches 575 is the output of a switch 595 that is operative to pass the input video signal during even video fields and ground reference potential during odd video fields of a video frame. In the system of FIG. 5, the clock rate used can be half of that which was employed in the FIG. 2 embodiment, since the odd and even subsystems are utilized simultaneously to read in and transfer sampled input video signals and ground reference potential (as the case may be) into respective odd and even rows of the array devices.

In operation of the system of FIG. 5, during an odd video field the switch 585 is operative to pass the input video signal so that, for example, during the first video scanline the input video signal is sampled, under control of shift register 580, and stored in capacitors C2a. Simultaneously, switch 595 is passing ground reference potential, which is being read into capacitors C3a under control of shift register 590. At the end of the first scanline, the switches 560 and 570 are momentarily enabled to transfer the signals from capacitors C2a into respective capacitors C2b, and to transfer the signals from capacitors C3a into capacitors C3b. The first row conductor 530, which is coupled to the devices of lines 1 and 2 of the array (as in the previous embodiment) is also enabled (and remains enabled during the next scanline, during which the sampled video signals (or ground reference potential, as the case may be) in capacitors C2b and C3b are transferred into the respective display electrodes of lines 1 and 2 of the array. During the next video field, the odd and even line conductors (and their associated circuits) reverse roles (by virtue of switching the status of switches 585 and 595) and ground reference potential is transferred into line 1 while the sampled video signal is transferred into line 2. It is noted in the referenced patents that a separate switching arrangement, such as for directly switching ground reference potential to the appropriate activated row, could be used.

Figure 6:
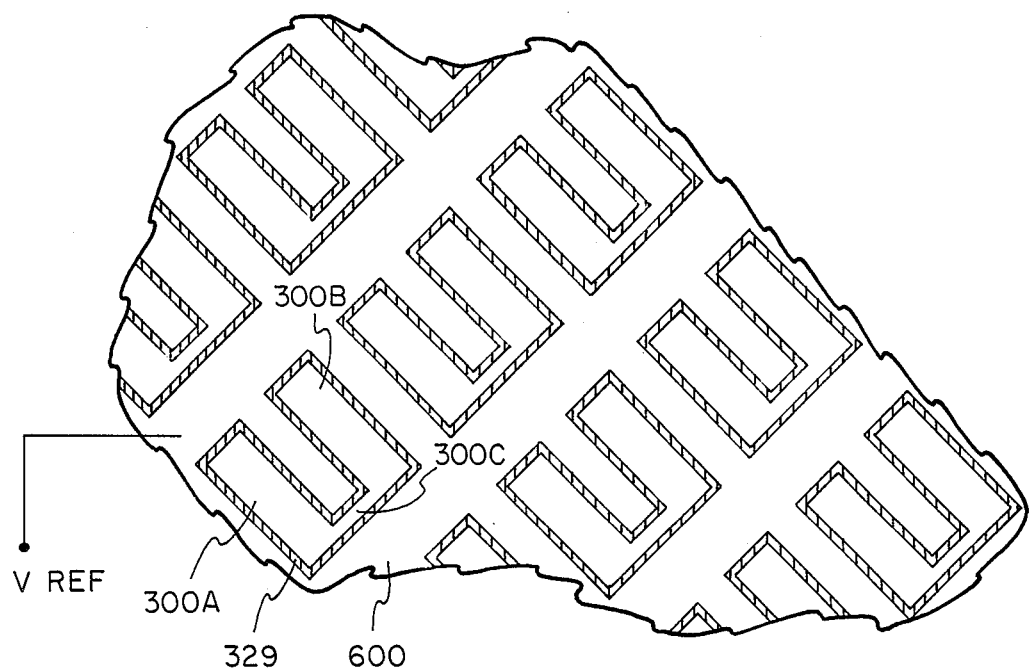
FIG. 6 shows a plan view of an electrode pattern and reference conductors in accordance with an improvement of the invention.

The improvements in accordance with the invention will now be described. In the embodiment of FIG. 6, each of the electrodes 300 (e.g. are coupled to diffusion region 320 in FIG. 4) comprises a pair of relatively large area conductive regions 300A and 300B, which are connected by narrow conductive region 300C. The regions 300A and 300B can be envisioned as a pair of electrode "fingers", which are at the same potential. In the FIG. 6 embodiment, most of the remaining surface around the electrodes is occupied by reference conductors which are represented by the common metalization 600 that can be coupled to a suitable referenced potential, $V_{ref}$. The reference conductors are separated from the electrodes, the silicon dioxide 329 below (see also FIG. 4) being visible between the separations in FIG. 6.

In operation, the signal on each electrode (as compared to the reference potential on the common metalization 600) will cause forces on the conductive/reflective layer 14 (e.g. FIG. 4), and will result in image formation with twice as many grating lines for the same number of electrodes, due to the presence of the spaced electrode fingers. It will be understood that in the addressing of the individual electrodes, since a reference potential ($V_{ref}$ in FIG. 6) is applied to the reference conductors, it is not necessary to insert ground reference potential into every other line, and each row of electrodes will be individually addressed.

In the embodiment of FIG. 6, if the signals applied to the reference conductors are the same and the signals applied to the electrodes are of the same polarity over a period of time, the light modulator can suffer from a permanent "memory"; that is, a permanent or semi-permanent pattern of protrusions and/or depressions in the conductive/reflective layer (and the elastomer layer below) which result from deflection of particular regions of the conductive/reflective layer 14 always being in the same direction. This can result in artifacts in the ultimately presented image.

One way of alleviating the "memory" problem is to vary the polarity of the signals applied to the electrodes of the array. For example, in the embodiment of FIG. 6, during one frame the input video signal can be applied with a black-to-white polarity in one direction (for example, with 0 volts as black and 20 volts as white), and during the next video frame, the input video signal can be applied with black-to-white polarity in the opposite direction (for example, with black at 0 volts and white at −20 volts).

The application of a different polarity of input signals to the electrodes during successive frames is useful in alleviating the problem of undesired "memory" of the modulator structure. However, the need to have voltage variations over a wider range (as in the example above) may be problematic.

Figure 7:
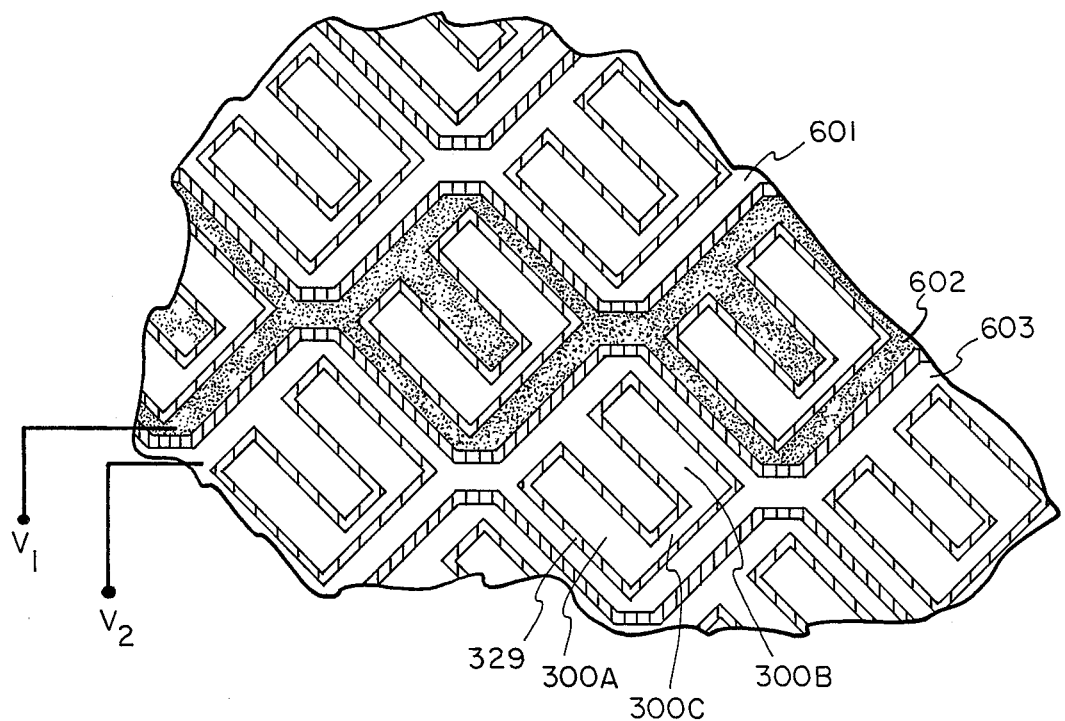
FIG. 7 shows a variation of the FIG. 6 embodiment, with a different arrangement of reference conductors.

FIG. 7 illustrates another embodiment of the invention which provides a solution to the stated problem. In this embodiment, the electrodes 300 are of the same configuration as in the FIG. 6 embodiment. However, in this case, the common metalization which comprises the reference conductors is divided so that individual scanlines of elements can have reference conductors at different reference potentials, for example $V_1$ for one line and $V_2$ for the next line, as shown in FIG. 7. [Three separated reference conductors 601, 602 and 603 are shown in FIG. 7, with 602 being shaded for clarity of illustration.] Another way of applying the input video signal would utilize the same range of voltages during successive frames, but would alter the reference potential applied to the reference conductors during successive frames, and would also reverse the polarity of the video signal applied to the electrodes during successive frames (or other desired periods). For example, if the voltage on the conductive/reflective layer 14 is a negative bias potential $-V_b$ (see, for example, my U.S. Pat. No. 4,639,788), during one frame the reference potential applied to the reference conductors could be 0 volts, with the applied video signal varying between 0 volts (for black) and 20 volts (for white); whereas, during the next frame the reference potential could be 20 volts, with the applied video signal varying between 20 volts (for black) and 0 volts (for white). In this arrangement, since the picture information for each line is retained for a full field, the reference potentials should be switched, a line at a time, as each new line of video information is read into the array. This is achieved in the embodiments of FIGS. 7, 10 and 13 hereof by separately connecting the reference conductors associated with each line of the array. A suitable flip-flop and switch (as first illustrated above) can be used to select the reference potentials, which can then be read in, a line at a time in conjunction with the video, using a register, in the manner first shown hereinabove. The means for selection of desired black and white levels, and the polarity of the video signals, is well known in the art.

Figure 8:
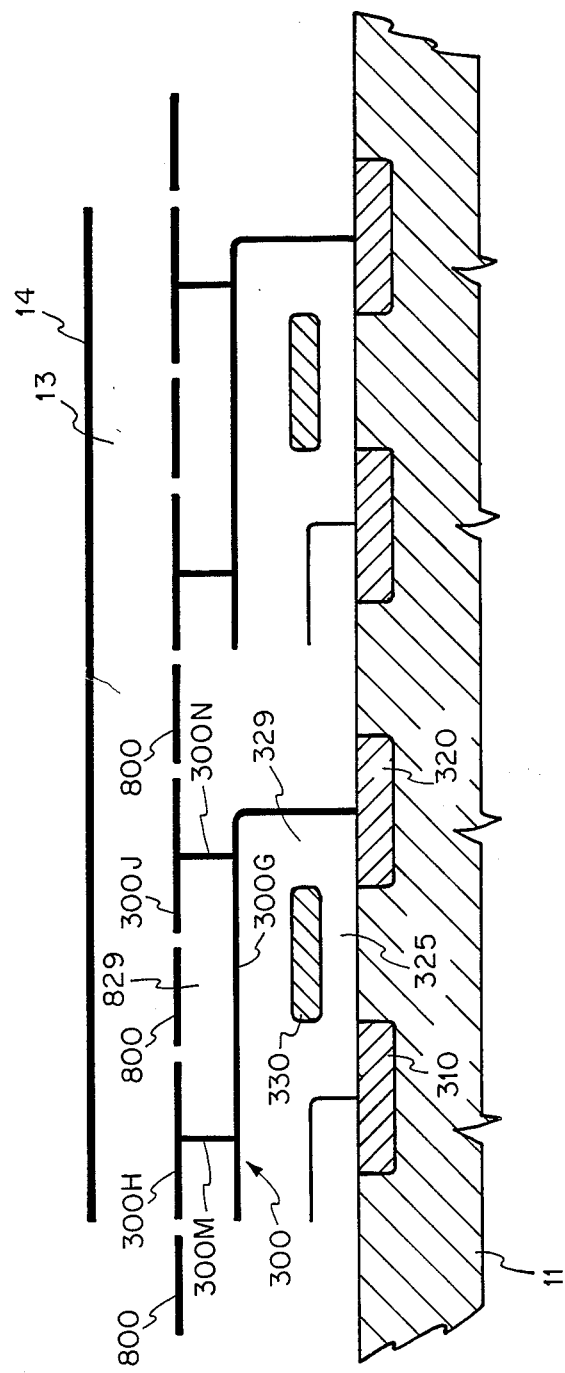
FIG. 8 shows a cross-sectional view of the devices of an array in accordance with a further embodiment of the invention.

Referring to FIG. 8, there is shown a further embodiment of the invention, wherein each of the electrodes 300 has conductive regions at two different levels. The elements in FIG. 8 which are of like reference numerals to elements of FIG. 4 serve the same or similar function. In FIG. 8, however, each of the electrodes 300 has a surface region 300G at a first level above the semiconductor substrate (and above its respective semiconductor device, in the illustrated configuration), and a pair of further spaced apart surface regions 300H and 300J at a second level above the first level, and connected thereto by vertical extensions 300M and 300N. The two levels are separated by an insulating layer 829 of silicon dioxide. The conductive region 300G, at the first level, is preferably of substantial area, so as to help prevent spurious light from reaching the semiconductor surface. If desired, reference conductive regions can also be provided at the first level. Reference conductive regions 800 are provided at the second level. The pattern of electrodes and reference conductive regions can be as shown in FIGS. 9 and 10; i.e., similar to FIGS. 6 and 7, respectively, but with no need for connection between the electrode fingers at the second level (since they are connected from below).

Figure 9:
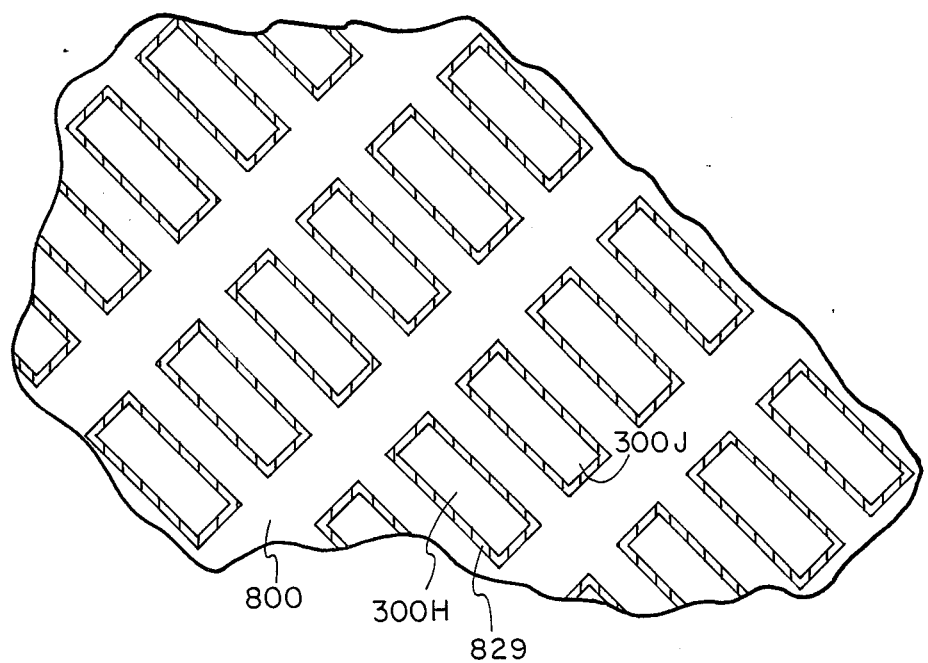
FIGS. 9 and 10 show plan views of two arrangements of electrodes and reference conductive regions of the FIG. 8 embodiment.
Figure 10:
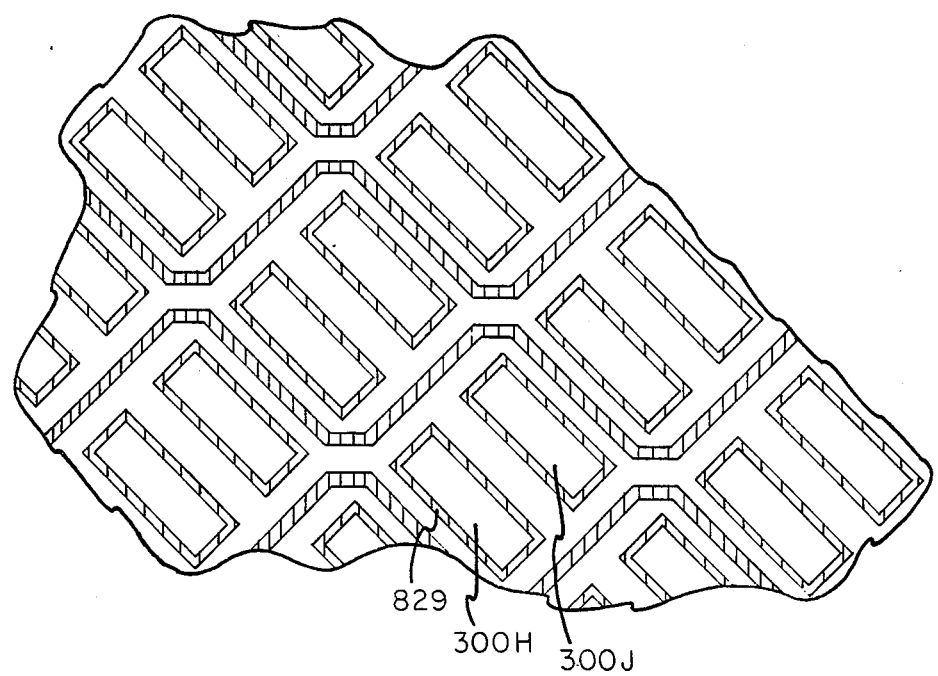

Operation of the embodiments illustrated in FIGS. 8-10 is similar to the operation described with reference to FIGS. 6 and 7, except that the electrodes and reference conductive regions are at the second level. They exert their forces on the conductive/reflective layer 14, as previously described, by virtue of the signals applied thereto. Although a further level of metallization is needed (as compared to the embodiments of FIGS. 6 and 7), there is improved light immunity, and the exposed connections between electrode fingers (e.g. 300C in FIGS. 6 or 7) are eliminated.

Figure 11:
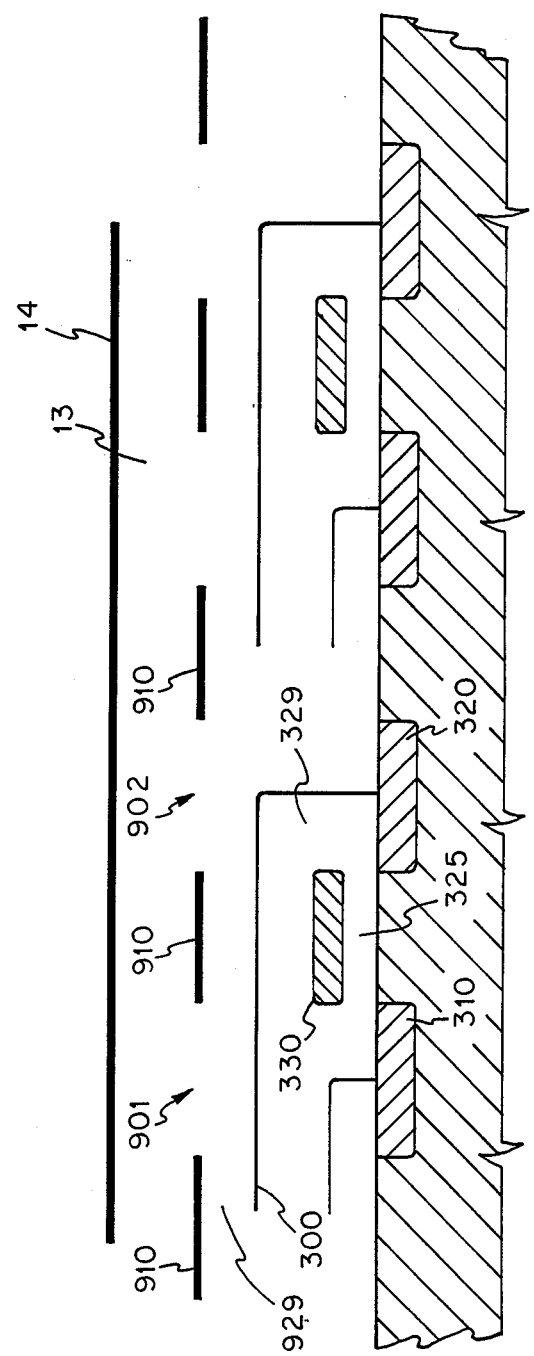
FIG. 11 shows a cross-sectional view of the devices of an array in accordance with a still further embodiment of the invention.
Figure 12:
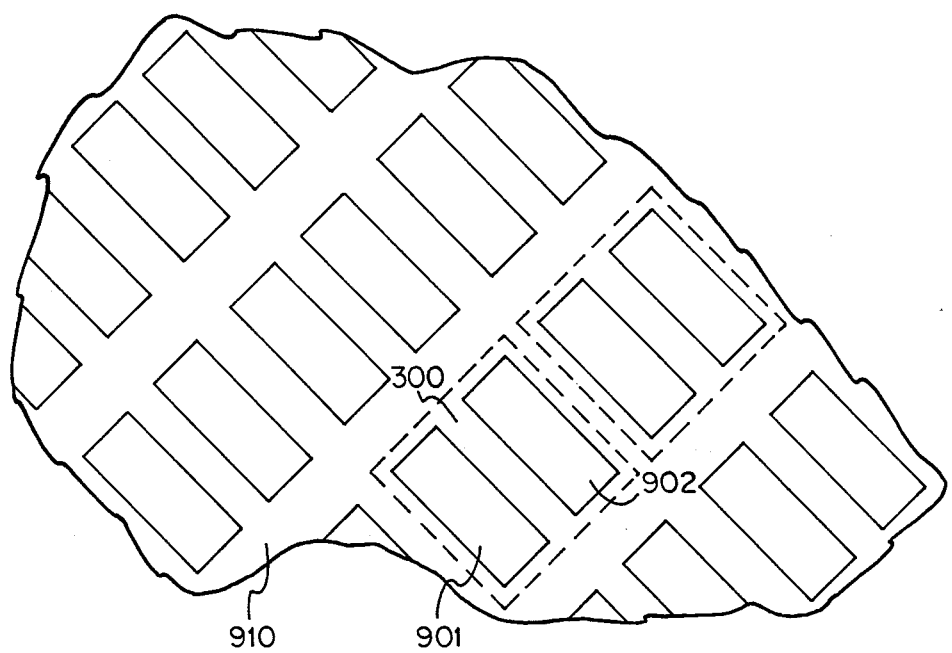
FIGS. 12 and 13 show plan views of two arrangements of the reference conductive regions of the FIG. 11 embodiment.
Figure 13:
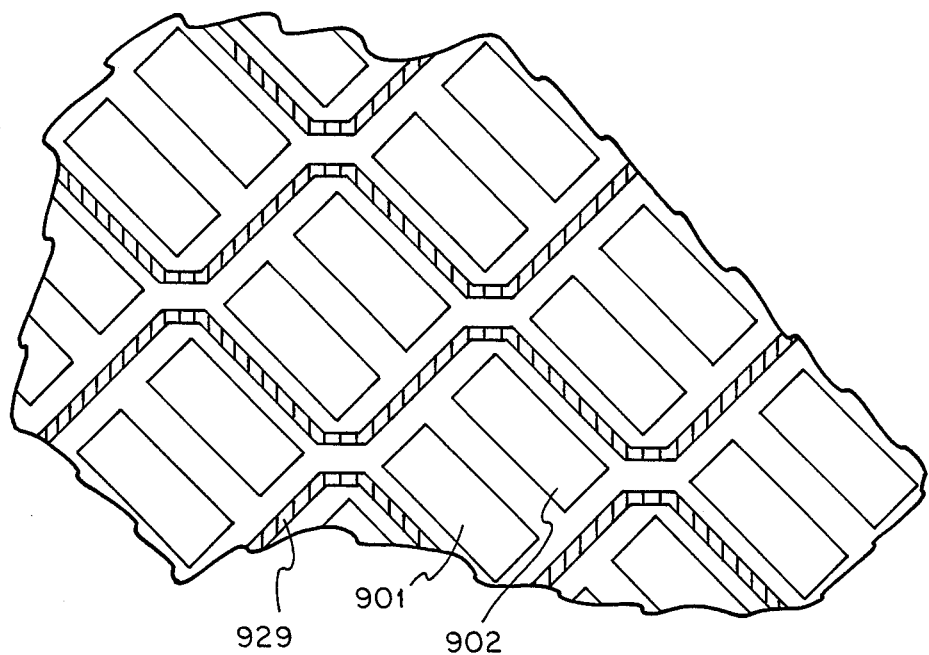

In the embodiments of FIGS. 11-13 the electrodes are at a first level and the second level contains only reference conductive regions. As shown in FIG. 11, for example, the electrodes 300 can be in a configuration similar to that illustrated in conjunction with FIG. 4. In this case, however, reference conductors 910 are seen to be provided at the second level, which is again separated from the first level by an insulating layer (929). The reference conductors 910 are seen to overlay only a portion of an electrode or electrodes 300. A reference potential (in FIG. 12, or reference potentials, in FIG. 13) are applied to the reference conductive regions. Due to the presence of the reference conductive regions, the plurality of portions of each electrode (there being division into two portions in this case, although division into more portions can be employed, if desired) results in the exposed portions of each electrode (i.e., those portions which are not covered by a reference conductive region) exerting a separate force with respect to the reflective/conductive layer 14. This results in a doubling (in this case) of the number of grating lines obtained from the array. In the embodiment of FIG. 12, the reference conductive electrodes are all coupled together in a common metallization, and a pair of spaced apertures, which are rectangular in this illustration, are positioned over two regions of each electrode. In FIG. 12, two of the apertures are also designated by reference numerals 901 and 902, and these are shown in the cross-section of FIG. 11. The dashed lines in FIG. 12 illustrate the electrode 300 below.

In the embodiment of FIG. 13, the reference conductive regions associated with each scan line are separate (as in the prior embodiments of FIGS. 7 and 10), so that different reference potentials can be applied to different lines.

The arrays of semiconductor devices hereof can be fabricated, for example, utilizing known semiconductor lithographic processes. Appropriate masks for the patterns of diffusions, electrodes, contracts, polysilicon and conductive layers, etc., are designed and utilized in sequences of selective diffusions, layer deposition, selective etching, electrode deposition, etc. (in the requisite order, as known in the art). The deformable layer 13 and conductive and reflective layer or layers 14 can be applied using techniques set forth, for example, in my U.S. Pat. No. 4,529,620 and 4,626,920, assigned to the same assignee as the present application.

The invention has been described with reference to particular preferred embodiments, but variations within the spirit and scope of the invention will occur to those skilled in the art. For example, the number, orientation, and shape of the electrode fingers is illustrative of the invention, and can be modified.

I claim:

1. In a video display apparatus for generating images represented by input video signals, said apparatus including: an array of semiconductor devices having respective electrodes to which charge is applied in accordance with the input video signals; a layer of deformable material disposed over said electrodes; a conductive/reflective layer disposed over said deformable layer; and optical means for converting deformations of the conductive/reflective layer into an image; the improvement comprising:

each of said electrodes of said array having a plurality of spaced conductive regions having respective surfaces of relatively large area in a common plane, the plurality of conductive regions of each of said electrodes being electrically connected in common by at least one conductor having, at most, a relatively small area in said plane;

reference conductive regions having surfaces in said plane between the surfaces of said electrodes and separated therefrom, at least some of said reference conductive regions being electrically connected in common; and means for applying said input video signals to said electrodes of said array, and for applying at least one reference potential to said reference conductive regions.

2. A display apparatus as defined by claim 1, wherein the reference conductive regions are all electrically connected in common.

3. The display apparatus as defined by claim 1, wherein the reference conductive regions associated with the electrodes of individual lines of the array are electrically connected in common.

4. The display apparatus as defined by claim 3, wherein said plurality of spaced conductive regions of said electrodes comprise spaced rectangular fingers.

5. The display device as defined by claim 4, wherein a layer of insulating material is disposed between said common plane and said array of semiconductor devices.

6. The display device as defined by claim 3, wherein a layer of insulating material is disposed between said common plane and said array of semiconductor devices.

7. The display apparatus as defined by claim 1, wherein said plurality of spaced conductive regions of said electrodes comprise spaced rectangular fingers.

8. The display apparatus as defined by claim 1, wherein said electrodes are diagonally oriented in said array.

9. The display apparatus as defined by claim 1, wherein said optical means comprises a Schlieren optical system.

10. The display device as defined by claim 1, wherein a layer of insulating material is disposed between said common plane and said array of semiconductor devices.

11. Apparatus for receiving video signals and displaying images represented by said video signals, comprising:

a semiconductor substrate having an array of columns and rows of devices formed on a surface thereof, said devices comprising: a transistor formed in said semiconductor substrate; a conductive electrode coupled to said transistor, said conductive electrode having a first surface region at a first level above said semicoductor substrate and a plurality of further spaced apart surface regions at a second level above said first level;

reference conductive regions having surfaces at said second level between the further surface regions of the electrodes of said devices and separated therefrom, at least some of said reference conductive regions being electrically connected in common;

means for selectively applying said video signals to the transistors of said devices of said array and for controlling said transistors so as to selectively couple said video signals to said electrodes;

means, for applying at least one reference potential to said reference conductive regions;

a conductive/reflective layer spaced from said second level;

a layer of deformable material between said second level and said conductive/reflective layer; and means for converting deformations of said conductive/reflective layer into an image.

12. Apparatus as defined by claim 11, wherein insulating material is disposed between the surface of said semiconductor substrate and said first level, and insulating material is also disposed between said first level and said second level.

13. Apparatus as defined by claim 12, wherein the reference conductive regions are all electrically connected in common.

14. Apparatus as defined by claim 12, wherein the reference conductive regions associated with electrodes of individual lines of the array are electrically connected in common.

15. Apparatus as defined by claim 14, wherein said plurality of further spaced conductive regions of the electrodes of said devices comprise spaced rectangular fingers.

16. Apparatus as defined by claim 12, wherein said plurality of further spaced conductive regions of the electrodes of said devices comprise spaced rectangular fingers.

17. Apparatus as defined by claim 12, wherein said electrodes are diagonally oriented in said array.

18. Apparatus as defined by claim 12, wherein said means for converting deformations of said conductive/reflective layer into an image comprises a Schlieren optical system.

19. Apparatus as defined by claim 11, wherein said plurality of further spaced conductive regions of the electrodes of said devices comprise spaced rectangular fingers.

20. Apparatus for receiving video signals and displaying images represented by said video signals, comprising:

a semiconductor substrate having an array of columns and rows of devices formed on a surface thereof, said devices comprising: a transistor formed in said semiconductor substrate; a conductive electrode coupled to said transistor and having a surface region at a first level above said semiconductor substrate; and a plurality of reference conductive regions at a second level above said surface region;

means for selectively applying said video signals to the transistors of said devices of said array and for controlling said transistors so as to selectively couple said video signals to the conductive electrodes of said devices;

means for applying at least one reference potential to said reference conductive regions;

a conductive/reflective layer spaced from said second level;

a layer of deformable material between said second level and said conductive/reflective layer; and means for converting deformations of said conductive/reflective layer into an image.

21. Apparatus as defined by claim 20, wherein insulating material is disposed between the surface of said semiconductor substrate and said first level, and insulating material is also disposed between said first level and said second level.

22. Apparatus as defined by claim 21, wherein said reference conductive regions comprise a conductive layer at said second level, said conductive layer having a plurality of openings above each of the electrodes of said devices.

23. Apparatus as defined by claim 22 wherein said conductive layer is divided into separate patterns above respective lines of said array.

24. Apparatus as defined by claim 23 wherein said openings are rectangular shaped.

25. Apparatus as defined by claim 22, wherein said openings are rectangular shaped.

26. Apparatus as defined by claim 22 wherein said electrodes are diagonally oriented in said array.

27. Apparatus as defined by claim 22, wherein said means for converting deformations of said conductive/reflective layer into an image means comprises a Schlieren optical system.

28. Apparatus as defined by claim 20, wherein said reference conductive regions overlay portions of the electrodes below.

29. Apparatus as defined by claim 20, wherein said reference conductive regions overlay portions of the electrodes below.

30. Apparatus for receiving video signals and displaying images represented by said video signals, comprising:

a semiconductor substrate having an array of columns and rows of devices formed on a surface thereof, said devices comprising: a transistor formed in said semiconductor substrate; a conductive electrode coupled to said transistor, said electrode having a plurality of spaced conductive regions of relatively large area in a common plane, the plurality of conductive regions of each said electrode being electrically connected in common by at least one conductor having, at most, a relatively small area in said common plane;

reference conductive regions having surfaces in said common plane between the surfaces of the electrodes of said devices, and separated therefrom, at least some of said reference conductive regions being electrically connected in common;

a conductive/reflective layer spaced from said common plane;

a layer of deformable material between said common plane and said conductive/reflective layer;

means for selectively applying said video signals to the transistors of the devices of said array and for controlling said transistors so as to selectively couple said video signals to said electrodes;

means for applying at least one reference potential to said reference conductive regions; and means for converting deformations of said conductive/reflective layer into an image.

31. Apparatus as defined by claim 30, wherein the reference conductive regions are all electrically connected in common.

32. Apparatus as defined by claim 31, wherein said plurality of spaced conductive regions of said electrodes comprise spaced rectangular fingers.

33. Apparatus as defined by claim 30, wherein the reference conductive regions associated with the electrodes of individual lines of the array are electrically connected in common.

34. Apparatus as defined by claim 33, wherein said plurality of spaced conductive regions of said electrodes comprise spaced rectangular fingers.

35. Apparatus as defined by claim 34, wherein a layer of insulating material is disposed between said common plane and said array of semiconductor devices.

36. Apparatus as defined by claim 30, wherein said plurality of spaced conductive regions of said electrodes comprise spaced rectangular fingers.

37. Apparatus as defined by claim 30, wherein said electrodes are diagonally oriented in said array.

38. Apparatus as defined by claim 30, wherein said means for converting deformations of said conductive/reflective layer into an image comprises a Schlieren optical system.

39. Apparatus as defined by claim 30, wherein a layer of insulating material is disposed between said common plane and said array of semiconductor devices.

40. A video display apparatus for generating images represented by input video signals, comprising:

an array of semiconductor devices arranged in a pattern of rows and columns and having respective electrodes to which charge can be applied in accordance with the input video signals, the electrodes of said array having a plurality of electrically connected fingers;

a layer of deformable material disposed over said electrodes;

a conductive/reflective layer disposed over said deformable layer;

optical means for converting deformations of the conductive/reflective layer into an image; and means for applying video signals to said devices.

* * * * *